E. R. SARGENT & H. G. COLLINS.
BOX HANDLE.
APPLICATION FILED JAN. 7, 1913.
1,094,681.
Patented Apr. 28, 1914.
2 SHEETS—SHEET 1.
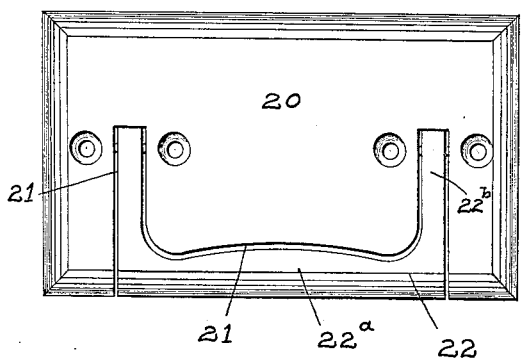
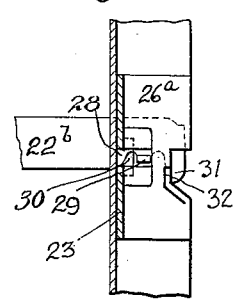
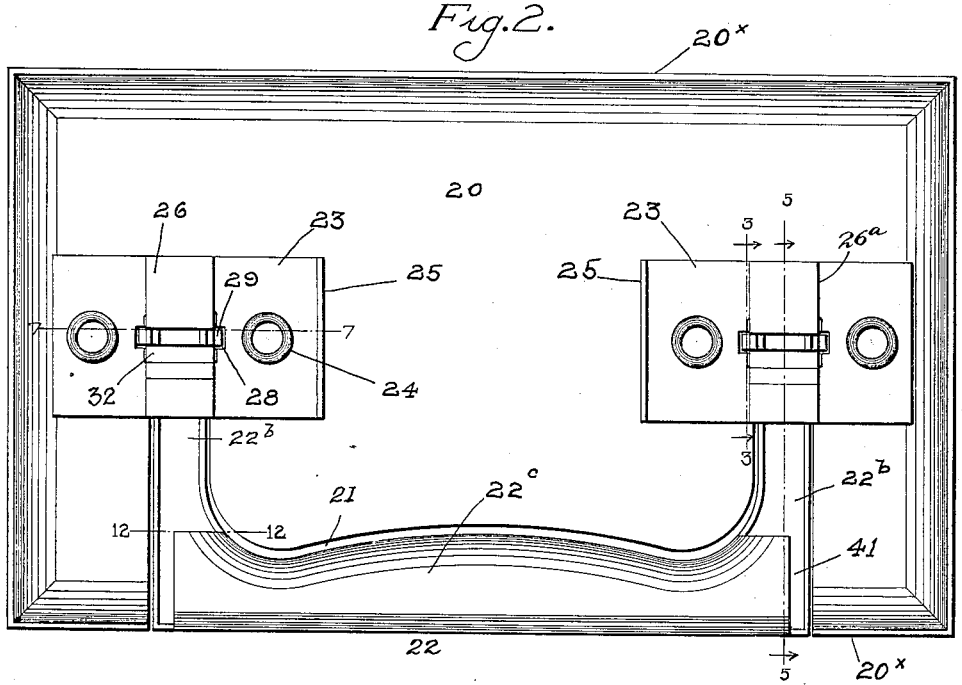
WITNESSES:
F. A. Carlson
Mary E. Fuller.
INVENTORS:
Edward R. Sargent
Herbert G. Collins,
BY
Beach & Fisher
ATTORNEYS.

E. R. SARGENT & H. G. COLLINS.
BOX HANDLE.
APPLICATION FILED JAN. 7, 1913.
1,094,681.
Patented Apr. 28, 1914.
2 SHEETS—SHEET 2.
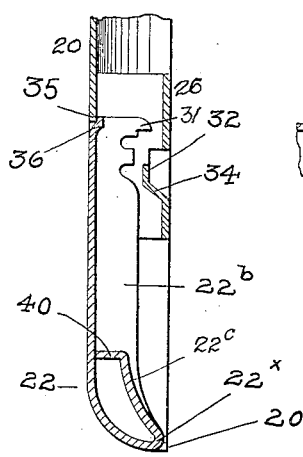
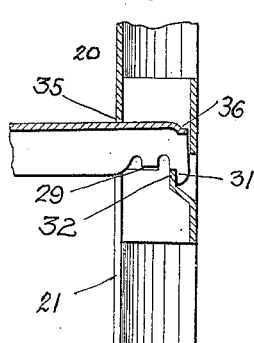
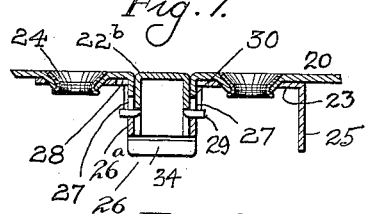
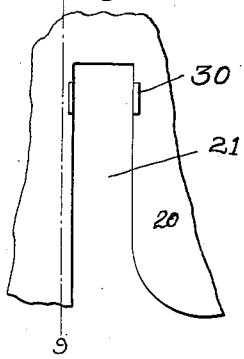
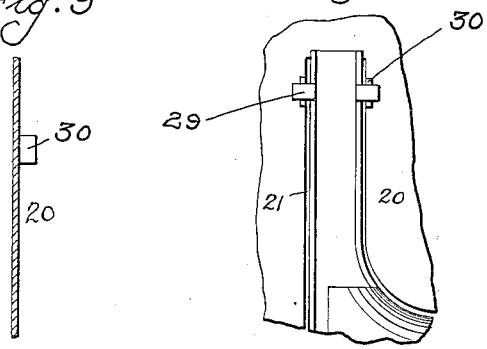
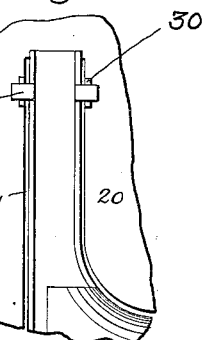
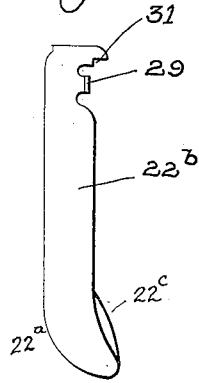
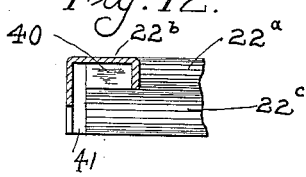
WITNESSES:
F. A. Carlson
Mary E. Fuller
INVENTORS:
Edward R. Sargent
Herbert G. Collins
BY Black & Fisher
ATTORNEYS.
COLUMBIA PLANOGRAPH CO., WASHINGTON, D. C.

UNITED STATES PATENT OFFICE.

EDWARD R. SARGENT AND HERBERT G. COLLINS, OF NEW HAVEN, CONNECTICUT, ASSIGNORS TO SARGENT & COMPANY, OF NEW HAVEN, CONNECTICUT, A CORPORATION OF CONNECTICUT.

BOX-HANDLE.

1,094,681.　　　　　Specification of Letters Patent.　　Patented Apr. 28, 1914.

Application filed January 7, 1913. Serial No. 740,651.

*To all whom it may concern:*

Be it known that we, EDWARD R. SARGENT and HERBERT G. COLLINS, both citizens of the United States, residing in New Haven, county of New Haven, and State of Connecticut, have invented certain new and useful Improvements in Box-Handles, of which the following is a full, clear, and exact description.

This invention relates to box handles, and more particularly to a type wherein a single socket plate or attaching plate is used, which is recessed or cut away to receive the bail or handle proper, so that the latter may lie substantially flush with the outer surface of the plate and conform more or less to the configuration or contour of the same.

Certain features of the invention are applicable, however, to other types of handles.

One of the primary objects of our invention is to provide a handle in which the bail or handle proper has one or both of its ends secured to the plate at the rear of the latter by means of a separate plate or keeper applied to the rear face of the attaching plate, said keeper and the corresponding end of the handle or bail being provided with integral pivot means, whereby the bail is pivotally mounted without the use of a separate pivot such as a cotter pin or the like. The elimination of the separate pivot pin improves the construction very materially for it is a matter of considerable difficulty to place such pins in position, and moreover, they are apt to work loose and become displaced.

Other objects of the invention are to provide means whereby the handle proper or bail will be so suspended under normal conditions that the fingers can be easily introduced beneath it in order to lift it; to improve the construction of the bail so that it will be stronger than heretofore; and to improve various details of the handle construction as a whole.

To these and other ends our invention consists in the novel features and combinations of parts to be hereinafter described and claimed.

In the accompanying drawings, Figure 1 is a front elevation of a box handle constructed in accordance with our invention, Fig. 2 is an enlarged rear elevation of the same, Fig. 3 is a section on line 3—3 of Fig. 2 showing the bail in its normal position, Fig. 4 is a similar view showing the bail raised, Fig. 5 is a section on line 5—5 of Fig. 2, Fig. 6 is a similar section showing the bail raised, Fig. 7 is a section on line 7—7 of Fig. 2, Fig. 8 is a detail rear face view of a portion of the attaching plate, Fig. 9 is a section on line 9—9 of Fig. 8, Fig. 10 is a view similar to Fig. 8 showing the location of the bail relatively to the attaching plate, Fig. 11 is an end elevation of the bail or handle proper, and Fig. 12 is a section on line 12—12 of Fig. 2.

Referring to the drawings, the attaching plate or socket plate 20 may be oblong in shape, as illustrated, or of any other desired form. It is cut away at 21 to receive the handle proper or bail 22 which in its pendant position lies substantially flush with the outer surface of the plate and generally conforms to the contour or configuration of the same. The bail 22 is substantially U-shaped, having a horizontal grip portion $22^a$ and upright hanger arms $22^b$ pivoted to the plate 20 at the rear of the latter by means of small plates 23 formed as keepers. These plates 23 are applied to the rear surface of the attaching plate by means of eyelets 24 through which the attaching screws (not shown) for the plate 20 are passed.

Each keeper plate 23 is provided at the end nearest the center of the attaching plate with a bent up flange 25 adapted to abut the wall of the box and thereby form a support for the central portion of the plate. At their middle portions, the keeper plates 23 are bent up to form U-shaped keepers 26 which extend transversely across the plates 23 in line with the upright cutaway portions of the plate 20. The keepers 26 are of substantially the same depth as the flanges 25 so that their inner surfaces will abut the surface of the box and thereby support the outwardly bulged main portion of the attaching plate in a substantial manner against the box. The opposite side walls 26ª of each U-shaped keeper 26 are provided with notches or openings 27 which extend to the front margin of said wall and communicate with openings 28 in the main portion of the keeper plate 23 and are adapted to receive laterally extending lugs 29 carried by the corresponding hanger arm 22ᵇ. Each hanger arm 22ᵇ is of U-shaped cross-section, as shown in Fig. 7, being closed at the front and open at the rear, and adjacent the upper end of each hanger arm the rearwardly directed side walls of the same are bent up at the edges to form the integral lateral projections 29 which extend into the openings 27 of the keeper 26 and support the bail pivotally. Adjacent the upper ends of the upright cutaway portions of the plate 20 which receive the hanger arms 22ᵇ, said plate is provided along the side edges of said cutaway portions with inwardly directed integral lugs 30 which confine the pivots 29 in the openings 27, as shown in Fig. 7. In assembling, the bail 22 is placed in the cutaway portion 21 of the attaching plate from the rear of the latter with the pivot lugs 29 resting on the lugs 30, as shown in Fig. 10, after which one of the keeper plates 23 is placed over each end of the bail. The openings 28 of the keeper plate clear the pivot lugs 29 and enable the latter to pass into the notches 27 of the opposite keeper walls 26ª, after which the keeper plate is secured in the assembled position by means of the eyelets 24. In this manner the bail will be securely pivoted to the plate by means of its integral pivot lugs 29, which are confined in the notches 27 by the lugs 30 with just the desired amount of play. As the lugs 29 and 30 are bent up integrally with the hanger arms and the attaching plate respectively, it will be understood that each keeper plate will pivot the corresponding hanger arm securely without the use of a separate pivot member, it being merely necessary to place the keeper plate over the end of the hanger arm and secure it to the attaching plate in that position with the pivoted end of the hanger arm confined between the keeper plate and the main attaching plate.

Above the lugs 29, each hanger arm 22ᵇ has its opposite side walls provided with hooks 31 adapted to coöperate, when the bail is raised, with an abutment 32 carried by the keeper 26. The abutment 32 is preferably formed by cutting away the middle portion of the keeper, at the rear thereof, as shown at 33 in Fig. 3, in order to form an abutment wall which is pressed in against the edges of the cutaway side walls of the keeper so that when the bail is raised, as shown in Figs. 4 and 6, the inwardly bent wall of the keeper will be engaged by the hook portions 31 of the corresponding hanger arm and will form a substantial abutment for said hanger arm. The abutment 32, and the edge 35 of the attaching plate which is located above the hanger arm, receive all the strain when the bail is lifted, there being no strain on the pivots 29. At the upper extremity of the outer wall of each hanger arm 22ᵇ we provide the hanger arm with a depressed marginal portion or rabbet 36 which in the pendant position of the bail extends slightly behind the edge 35 of the attaching plate and abuts the rear face of the latter. In this manner the bail 22 is given a tendency to spring forwardly out of the recess 21 to a slight extent, so that the lower rear edge 22ˣ of the bail will be slightly spaced from the rear edge 20ˣ of the attaching plate. This facilitates the lifting of the bail, as the fingers may be more readily introduced between the lower edge of the bail and the wall of the box.

While the hanger arms 22ᵇ of the bail are preferably of U-shaped cross-section, as previously described, the grip portion 22ª is preferably of completely closed cross-section. The rear wall 22ᶜ of the grip portion is folded upwardly and inwardly, as shown in Fig. 5, and this rear wall reinforces the U-shaped hanger arms 22ᵇ by being extended slightly into said hanger arms at the rear and provided with lugs 40 abutting the rear surfaces of the front walls of said hanger arms, as shown in Figs. 5 and 12. The ends of the rear wall 22ᶜ of the grip portion are preferably spaced to a slight extent from those walls of the hanger arms which are at the respective ends of the bail, as shown at 41, so that any plating solution which enters the hollow grip portion of the bail will readily run out of the same.

Without limiting ourselves to the construction shown we claim:

1. In a box handle, the combination of an attaching plate, a bail having hanger arms, each of said hanger arms having pivots formed integral therewith at opposite sides and extending in opposite directions, said hanger arms extending into cutaway portions of said attaching plate, and keeper plates confining the respective hanger arm pivots between said plates and the rear surface of the attaching plate; substantially as described.

2. In a box handle, the combination of an attaching plate having cutaway portions, a bail having hanger arms, each of said hanger arms being provided with integral pivots extending from the opposite sides thereof in opposite directions, a U-shaped keeper plate confining the pivots of each hanger arm between it and the rear surface of the attaching plate, and means for securing said keeper plates to the rear surface of the attaching plate; substantially as described.

3. In a box handle, the combination of an attaching plate having a cutaway portion, a hanger arm located within said cutaway portion and having integral pivots, and a keeper plate attached to the rear surface of said attaching plate and having opposite side walls, said walls having notches therein extending to the respective front margins of said walls and fitting over said pivots; substantially as described.

4. In a box handle, the combination of an attaching plate having a cutaway portion, a hanger arm located in said cutaway portion and having a laterally extending pivot, and a keeper plate secured to the rear surface of said attaching plate, said keeper plate having a wall with a notch therein extending to the front margin of said wall and fitting over said pivot, whereby the latter is confined between the keeper plate and the attaching plates; substantially as described.

5. In a box handle, the combination of an attaching plate having a cutaway portion, and a rearwardly directed lug at the edge of said cutaway portion, a hanger arm located in said cutaway portion and having a pivot lug extending laterally over said first named lug, and a keeper having an opening in which said second lug is confined by the first; substantially as described.

6. In a box handle, an attaching plate having a cutaway portion with rearwardly projecting lugs at opposite sides thereof, a hanger arm of U-shaped cross-section located in said cutaway portion and having laterally extending lugs overlying said first named lugs, and a U-shaped keeper applied to the rear surface of said plate and having openings in said opposite side walls in which said second lugs are confined by said first lugs; substantially as described.

7. In a box handle, the combination of an attaching plate having a cutaway portion, a bail located in said cutaway portion, and separate keeper plates for securing said bail pivotally to said attaching plate, applied to the rear surface of the attaching plate and having upright marginal supporting flanges at those ends thereof which are nearest the center of the attaching plate; substantially as described.

8. In a box handle, the combination of an attaching plate, a hanger arm having a hooked extremity, and a keeper plate secured to the rear face of said attaching plate and connecting the hanger arm pivotally with the latter, said keeper plate having a U-shaped portion confining the hanger arm and being provided with a cutaway middle portion having an inwardly bent abutment wall for the hooked extremity of the hanger arm; substantially as described.

9. In a box handle, the combination of an attaching plate having a cutaway portion, a hanger arm lying in said cutaway portion substantially flush with the front surface of said plate, and means for securing said hanger arm to the plate, the upper extremity of said hanger arm being provided with a depression or rabbet extending back of the adjacent edge of the attaching plate; substantially as described.

10. In a box handle, a bail consisting of hanger arms of U-shaped cross-section, and a connecting grip portion having a rear wall closing the cross-section of said grip portion, said rear wall of the grip portion being provided with portions extended into and abutting the front walls of the respective hanger arms; substantially as described.

11. In a box handle, a bail comprising hanger arms of U-shaped cross section, and a connecting grip portion having a rear wall bent upwardly and provided at at least one end with a lug extending into one of the hanger arms and supporting the front wall of the latter; substantially as described.

12. In a box handle, an attaching plate having a cutaway portion with a rearwardly extending lug, a hanger arm having a pivot, and a keeper plate fitting over said pivot and confining the latter between said lug and said keeper plate; substantially as described.

13. In a box handle, an attaching plate having a cutaway portion with rearwardly extending lugs at opposite edges thereof, a hanger arm, and means including a separate keeper plate coöperating with said lugs to pivot the hanger arm to said plate; substantially as described.

14. In a box handle, an attaching plate having a cutaway portion with rearwardly extending lugs at opposite margins thereof, a hanger arm, pivot means connected with the hanger arm and overlying said lugs, and a separate keeper plate set over said pivot means and securing the latter in position relative to said lugs; substantially as described.

15. In a box handle, the combination of an attaching plate having a cutaway portion, a hanger arm located in said cutaway portion and having a laterally extending pivot, and a plate attached to the rear surface of said attaching plate, having a side wall with an opening taking over said pivot, said opening extending from the intermediate portion of said side wall to a margin thereof; substantially as described.

16. In a box handle, the combination of an attaching plate, a hanger arm having a pivot located at the rear of said attaching plate, a keeper plate including a wall lying parallel to the attaching plate at the rear surface thereof, and having a clearance opening and a second wall extending rearwardly from said first wall, and provided with a pivot-receiving notch communicating with said clearance opening, and means to secure said keeper plate to said attaching plate; substantially as described.

In witness whereof, we have hereunto set our hands on the 6th day of January, 1913.

EDWARD R. SARGENT.
HERBERT G. COLLINS.

Witnesses:
I. E. GRADY,
CARL W. CARLSON.